Patented Oct. 8, 1940

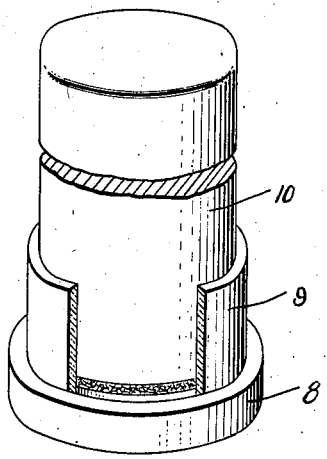
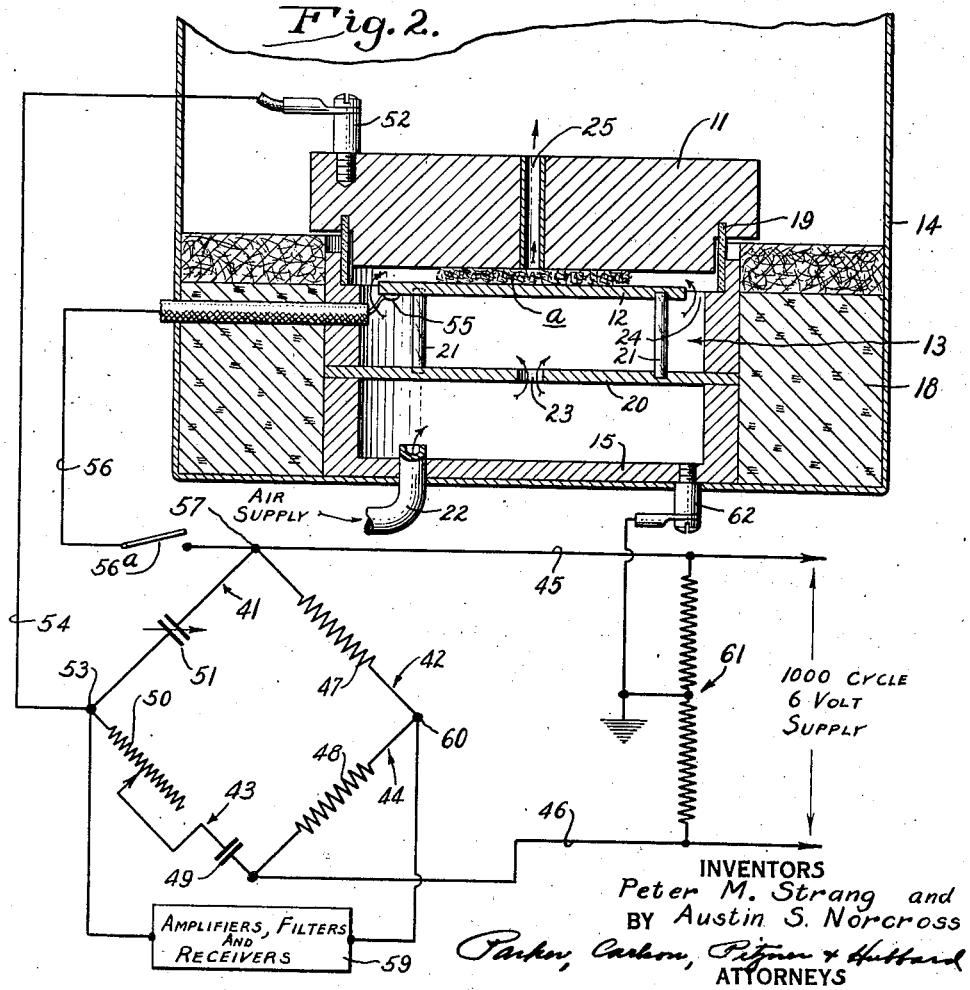

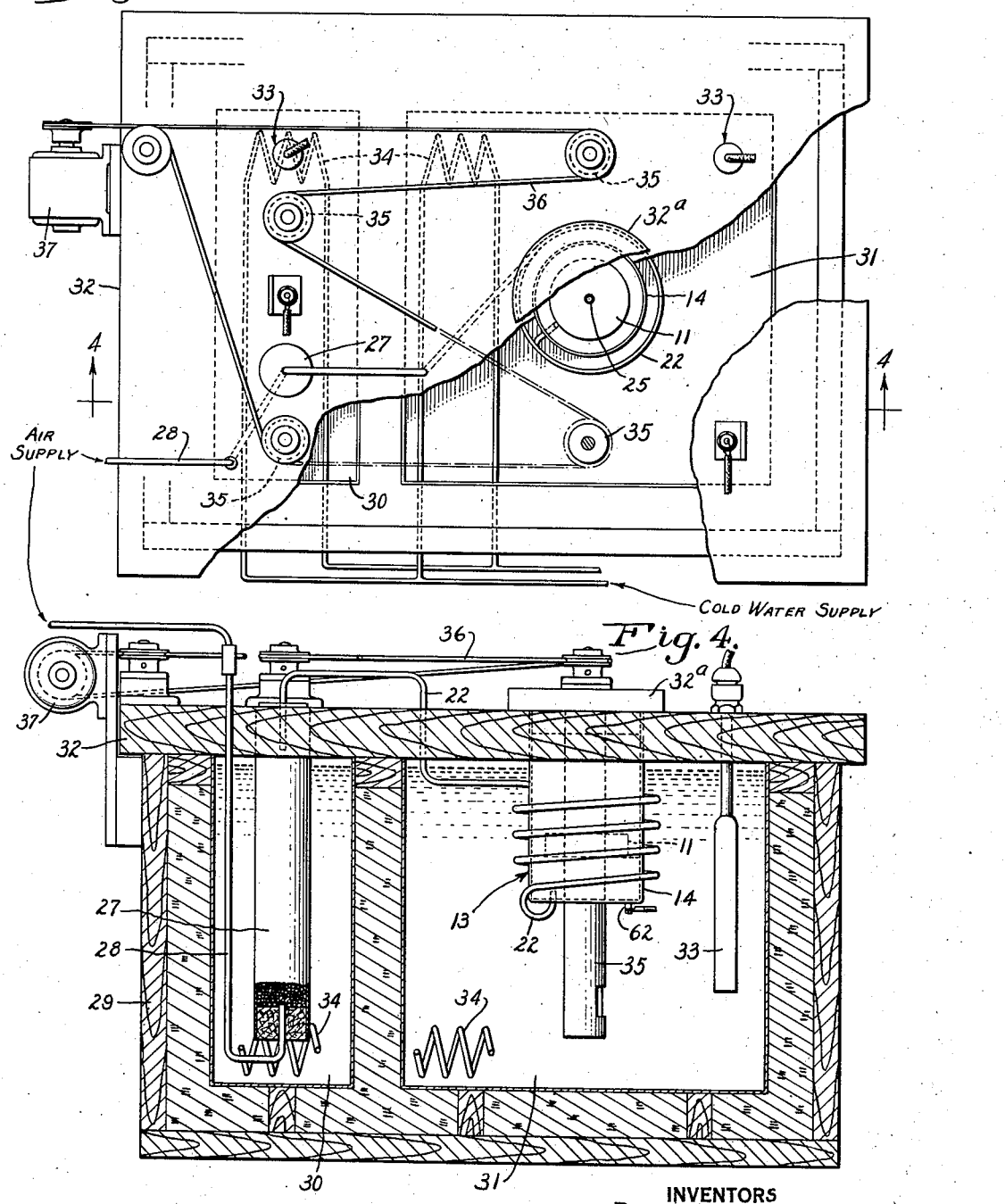

2,217,626

UNITED STATES PATENT OFFICE 2,217,626

METHOD OF AND APPARATUS FOR TESTING FIBROUS TEXTILE MATERIALS

Peter M. Strang, Auburndale, and Austin S. Norcross, Newton, Mass., assignors, by mesne assignments, to Peter M. Strang Application September 29, 1937, Serial No. 166,428

22 Claims. (Cl. 175—183)

The invention pertains to the art of classing fibrous textile materials such as cotton for the purpose of determining the manufacturing value thereof, and has particular reference to the determination of certain properties of unspun cotton, commonly referred to by the general term "character."

The classification of cotton according to prevailing methods involves the determination of three main factors, namely, length or staple, grade, and character. Of these, the staple and grade factors are susceptible of reasonably accurate and reliable determination; but the character factor is dependent upon many characteristics directly involved in the structure of the fibre such as chemical composition and maturity, cross sectional area, circularity, spirality and other physical characteristics. While certain of these characteristics are ascertainable by complex and expensive laboratory methods, the determination of the so-called character factor of cotton has depended upon the judgment of experts, known as classers, exercising such human faculties as the senses of sight, touch and hearing. This method is speculative, inaccurate and unreliable.

The primary object of the invention is to provide for the testing of fibrous textile materials such as unspun cotton to determine certain properties affecting substantially the manufacturing value of the material.

Another object is to provide a reliable index of the character factor of unspun cotton.

Another object is to provide for the determination of the character factor of unspun cotton through the measurement in the presence of moisture of one or more electrical properties of the cotton.

Another object is to provide a reliable index of the character of unspun cotton by measuring the electrical resistance thereof at a predetermined high relative humidity.

A further object is to provide a practical method of and apparatus for performing the testing operation.

In the accompanying drawings:

Figure 1 is a fragmentary perspective view of a forming device employed in producing cotton samples of uniform size and shape.

Fig. 2 is a fragmentary vertical sectional view through a holder for the sample under test, further showing schematically a preferred form of testing circuit.

Fig. 3 is a fragmentary top plan view of a testing apparatus embodying the invention and showing particularly the construction and arrangement provided for conditioning the sample.

Fig. 4 is a vertical sectional view taken approximately in the plane of line 4—4 of Fig. 3.

The invention has been found to be particularly adapted for use in the determination of the manufacturing value of cotton and more especially the character factor affecting substantially the spinning quality of the cotton. Accordingly, it will be convenient in the following description to set forth the invention as applied to the testing of the character factor of unspun cotton.

The invention is predicated on the discovery that of the three principal factors involved in the classification of cotton, namely staple or length of fiber, grade and character, the latter is peculiarly correlated with certain electrical properties, such as resistance and capacitance, which are susceptible of measurement under proper conditions so as to constitute a reliable index of character. The electrical property measured may be the direct current resistance of the cotton, the alternating current resistance, or the capacitance. In the preferred embodiment, the alternating current resistance of the cotton is measured in the presence of moisture.

For testing purposes, relatively small samples or specimens of uniform size and weight are selected; and preliminary to and during the measurement of the resistance, the samples are exposed for a predetermined time interval, as for example three minutes, to moist air. To obtain reliable results, a high degree of uniformity in the testing conditions must be maintained.

As between good and poor character cotton, extensive tests have shown that the former has a higher resistance value. The reason for this phenomenon is not clear, but it may be due to variations in the effect of moisture upon the different cottons, such variations being perhaps dependent upon the different characteristics of the fibre structure such, for example, as its maturity, circularity, cross-sectional area, and chemical composition. In any event, the presence of moisture in the cotton during the test is of vital importance, and it may accordingly be assumed that the moisture forms with the soluble salts and perhaps other elements a conducting solution directly affecting measurable electrical characteristics so as to afford the desired index of character.

As above indicated, it is highly important that comparative tests of different cottons be conducted under identical conditions. In practice the samples to be tested are placed in a test or conditioning chamber to which moist air is supplied at a rigidly maintained predetermined temperature and humidity. The conditioning air is preferably of high relative humidity for it has been found that best results are obtained under such a condition. This is because it is more practicable to obtain uniform conditions by the addition of moisture than by extraction. Moreover, the conditions to which the cotton may have previously been subjected are unknown, and greater uniformity is obtained by increasing the moisture content to a point above that which it might normally be expected to have had before.

In selecting samples for testing, care must be exercised to insure reliable results. To obtain uniformity of size and shape of the different samples, a forming device is employed. As shown in Fig. 1, this device comprises a glass cup having a base 8, a cylindrical side wall 9 and a weight 10 fitting loosely within the cup. In practice, a number of specimens are taken from each bale. For this purpose small quantities of cotton are taken from different portions of the bale and mixed, and from the mixture thus formed, portions are extracted, carefully weighed and then placed beneath the weight in the sample former for compression. As shown, the sample thus produced is in the form of a thin disk of substantially equal density.

Referring now to Fig. 2, a designates a sample disposed between two electrodes 11 and 12 in a test chamber 13. The electrodes thus form a sample holder and the upper electrode also constitutes a cover for a hollow cylindrical body 15 so as to form the test chamber 13. The body 15 is disposed in good heat-conducting relation to an outer cylindrical shell 14, the bottom wall of the body being herein shown as resting directly upon the bottom of the shell. If desired, the body 15 may be surrounded by a ring 18 of insulating material such as cork.

Between the body 15 and upper electrode 11 is interposed a glass ring 19 and between the electrode 12 and a lower partition member 20 are interposed glass supporting pins 21. With this arrangement the electrodes are maintained in fixed positions with sufficient space between them to accommodate the sample a. It will of course be understood that the maintenance of the electrodes in true parallel relation is important.

To reduce to a minimum the possibility of introducing variables in the test results, provision is made for maintaining the samples under uniform conditions as to temperature and humidity. To this end the test chamber 13 is maintained at a predetermined constant temperature and supplied with conditioned air of a predetermined relative humidity. As shown in Fig. 2, the conditioning air is introduced through a supply tube 22 into the lower portion of the chamber beneath the partition 20 and near one side of the chamber. Centrally of the partition is an opening 23 through which the air may pass into the upper portion of the chamber.

The lower electrode 12 in the upper portion of the conditioning chamber is made of a diameter somewhat less than the internal diameter of the hollow body 15, thereby forming an annular slot 24; and the upper electrode 11 has an axial exhaust tube 25. By this arrangement the conditioning air passes upwardly through the slot 24 and thence radially inward through the sample interposed between the electrodes, finally escaping upward through the discharge tube 25 into the upper portion of the shell 14. Thus all portions of the sample are subjected uniformly to the conditioning air.

The air delivered to the sample holder passes through a bubbling tower 27 (Fig. 4) of any well known character. Air under pressure from a suitable source is delivered to the bottom of the tower through a supply pipe 28. From the upper portion of the tower the air passes to the supply tube 22 leading into the bottom of the conditioning chamber.

To control the temperature and relative humidity of the conditioning air, the outer cylindrical shell 14 and the bubbling tower 27 are each substantially immersed in a body of distilled water, and the water in each instance is rigidly maintained at predetermined temperature. The moisture supplied to the test chamber 13 is derived from the bubbling tower. The use of distilled water for this purpose is important because it tends to avoid the introduction of impurities into the sample.

For the purpose of maintaining predetermined temperatures, the apparatus comprises a main casing structure 29 providing two tank compartments 30 and 31 insulated from each other and from the surrounding atmosphere. The casing structure has a removable top cover 32 constituting a supporting plate for the sample holder and bubbling tower as well as for other associated parts. If desired the air supply tube 22 may be coiled about the outer shell 14 of the sample holder so as to be in good heat-conducting relation thereto. Above the supporting plate 32 the outer shell has a cover 32ª fitting loosely so as to permit the escape of air from the upper portion of the shell 14.

Heat is supplied to or extracted from the respective compartments as may be necessary to maintain the same at the desired predetermined temperatures. To this end the apparatus is equipped with electric immersion heaters 33 and cooling coils 34, and the amount of heat supplied or extracted is governed by a sensitive control system (not shown) of any suitable or preferred character. It is especially important that the temperature of the sample holder be rigidly maintained. Accordingly, a thermocouple is preferably mounted therein so that appropriate compensating measures may be taken in the event of any appreciable departure from the desired fixed temperature.

In practice, the temperature of the water in the two tank compartments 30 and 31 is maintained substantially constant with a total variation of approximately .02 degree C. After passing through the bubbling tower the air has a constant relative humidity of almost 100%. The tank compartment 31 is maintained at a temperature equal to or above that of the tank compartment 30. Herein the compartment 31 is maintained at a temperature (e. g., 25° C.) several degrees above the temperature (e. g., 22° C.) of the compartment 30; and as the air passes through the coils of the supply tube 22 its temperature is raised to the temperature of the water within the tank compartment 31. Accordingly, the air discharged into the test chamber of the sample holder has a reduced relative humidity (e. g., 80 to 85 per cent.). To assist in the maintenance of uniform conditions throughout, each of the tanks has one or more stirring devices 35 (Figs. 3 and 4) operatively connected by a belt 36 driven by a small electric motor 37. The cooling coils 34 may be connected with any suitable source of cooling medium, as, for example, cold water.

In the preferred embodiment of the invention, the samples are comparatively tested electrically in the presence of moisture by measuring the alternating current resistance thereof by means of an adaptation of the so-called Wien bridge. This bridge includes four impedance arms 41, 42, 43 and 44 arranged with the arms 41 and 43 connected in series across main supply lines 45 and 46 of a suitable source of alternating current, the other arms 42 and 44 also being connected in series across the same source of alternating current in parallel relation with the first pair of arms.

For the sake of simplicity of calculation, the arms 42 and 44 preferably include resistances 47 and 48 of equal magnitude and preferably of a resistance of about 5000 ohms each. The arm 43 is made up of a fixed precision condenser 49 and a variable resistance 50 connected in series therewith. The fourth arm 41, on the other hand, includes a variable condenser 51 and a parallel connected impedance made up of a cotton sample $a$ in its holder. Thus, one terminal 52 of the holder is connected to bridge terminal 53 through conductor 54, and the other terminal 55 of the holder is connected by conductor 56 to bridge terminal 57. If desired, a switch 56$^a$ may be interposed in the conductor 56.

When bridge terminals 53 and 60 are of equal potential, or, in other words, when the bridge is in balance, the impedance of the arm 41 will bear the same ratio to the impedance of the arm 43 as the impedance of arm 42 bears to the impedance of arm 44. Consequently, the resistance 50 and variable condenser 51 may be adjusted until the desired condition of balance is attained and the resistance of the cotton sample can then be readily calculated from the known constants of the circuit.

A suitable detecting device 59, such as a pair of receivers, may be connected across bridge terminals 53 and 60 through the medium of an amplifier or the like in order to detect the point of equal potential or balance, this condition of balance being indicated by the lack of hum or buzzing noise in the receivers. It is desirable that the source of alternating current be of a relatively high or audible frequency, a 1000 cycle source at 6 volts having been found suitable for the purpose.

With such an arrangement the series resistor 50 in the bridge arm 43 may be of a relatively small value as compared to the resistance of the cotton sample, and for convenience of measurement the size of the sample and the circuit constants are preferably so chosen that approximately the same or a greater percentage change will be had in the value of the resistor 50 as compared to changes in the value of the resistance of the cotton sample. For practical purposes, the resistance of the cotton sample may be assumed to be proportional to the reciprocal of the value of the resistor 50.

A balanced resistance 61 connected across the main supply lines 45 and 46 provides a neutral grounding point for the sample holder, the grounding terminal being shown at 62. The points 53 and 60 of the bridge, because of this arrangement, are always at ground potential when the bridge is balanced. The ground connection tends to remove the effect on the bridge of leakage from the sample holder.

The size of the samples selected for testing should preferably be only large enough to be fairly representative. This is because it is difficult to secure effectual penetration of large samples by the conditioning air. Satisfactory results have accordingly been obtained with samples weighing approximately 300 milligrams and shaped into a disk approximately two inches in diameter, and one-quarter of an inch in thickness. With such samples, the range between poor and good character cotton has been found to run from 10 to 50 megohms with readings of 2000 and 400 ohms respectively of the variable bridge rheostat 50.

It will be seen that in a broad sense the invention provides for the determination of the manufacturing value of cotton, for while it has heretofore been possible to determine the grade and staple factors, different cottons of equal grade and staple differ so widely in manufacturing value that in the absence of a reliable guide to the determination of the character factor it has been impossible to evaluate the cotton satisfactorily. In practicing the invention it is first necessary to obtain a standard of comparison for given test conditions. Assuming that the manufacturing value to be determined is that of spinning quality, samples are selected from two different cottons of equal grade and staple but known by actual spinning tests to be respectively good and poor. The samples are then subjected to comparative character tests under conditions rigidly maintained uniform, and in each instance the effect of the samples under test upon the characteristics of an electrical circuit are noted, the measurement of the alternating current resistance of the samples having been found most satisfactory. Since the grade and staple of the samples under comparative test are the same, and the good cotton possesses a high resistance value as compared to the poor cotton, it is apparent that a standard of comparison may be obtained for any given test conditions. Accordingly, the testing of any cotton of unknown value to determine the electrical resistance thereof will under such given test conditions afford a reliable index of the character factor of such cotton and therefore render it possible to determine the manufacturing value thereof.

It is believed that this invention is the first to provide for the determination of the manufacturing value of a textile fibrous material, such as unspun cotton, by the measurement of its electrical characteristics in the presence of moisture. While a preferred embodiment of the invention has been set forth with considerable particularity, it is contemplated that various changes and modifications may be made by those skilled in the art without departing from the spirit and scope of the invention as defined in the appended claims.

We claim as our invention:

1. The method of testing the textile manufacturing value of fibrous textile materials which comprises conditioning a sample of the material to a predetermined relative humidity, and then observing the effect of the sample upon the characteristics of an electric circuit.

2. The method of determining the character factor of unspun cotton which comprises measuring the electrical resistance of a sample of the cotton in a moist atmosphere of predetermined relative humidity.

3. The method of determining the character factor of unspun cottons which comprises measuring the electrical resistance of samples of the different cottons under like predetermined temperature and humidity conditions.

4. The method of obtaining an index of the character factor of unspun cotton which comprises subjecting a specimen to the action of conditioned air at a predetermined high relative humidity and for a predetermined period of time, and then measuring an electrical characteristic of the specimen.

5. The method of determining the character factor of unspun cotton which comprises interposing a sample of cotton in an electric circuit connected with a high frequency source of alternating current, subjecting the sample to the absorption of moisture under predetermined conditions as to temperature and humidity, and measuring the alternating current resistance of the sample.

6. The method of obtaining an index of the character factor of unspun cotton which comprises subjecting a specimen to the action of air at a predetermined high relative humidity, and then measuring the alternating current resistance of the specimen.

7. The method of determining the character factor of unspun cotton of known grade and staple, which comprises conditioning a sample of the cotton to a predetermined high relative humidity, and measuring the electrical resistance of the sample when thus conditioned.

8. The method of testing the character factor of unspun cottons, which comprises maintaining samples of the different cottons under predetermined conditions as to temperature and humidity, and measuring one or more of the electrical characteristics of the various samples.

9. The method of testing the character factor of cotton, which comprises subjecting samples of different cottons uniformly to moisture, and observing the effect of each sample upon the characteristics of an electric circuit.

10. The method of testing the character factor of unspun cottons which comprises selecting samples of known grade and staple, and comparing the relative electrical characteristics of the samples.

11. The method of testing the character factor of cottons which comprises selecting specimens of different cottons of comparable grade and staple, and measuring the alternating current resistance of the respective specimens under comparable conditions as to temperature and humidity.

12. The method of testing the character factor of cottons which comprises selecting specimens of different cottons of like grade and staple, uniformly conditioning the specimens for a predetermined time in air of predetermined relative humidity, and then observing the effect of each specimen upon the characteristics of an electric circuit.

13. The method of determining the textile manufacturing value of fibrous textile materials which comprises subjecting a sample of the material to moisture for a predetermined time under predetermined conditions of temperature and humidity, and observing the effect of the sample upon the characteristics of an electric circuit.

14. The method of testing the character factor of cottons which comprises selecting specimens of different cottons of like grade and staple, forming said specimens into samples of uniform size and weight, uniformly conditioning the samples for a predetermined time in air of predetermined relative humidity, and then observing the effect of the different samples upon the characteristics of an electric circuit.

15. The method of determining the character factor of unspun cottons which comprises interposing a sample of the cotton to be tested between a pair of spaced electrodes, passing conditioning air for a predetermined time through a body of distilled water and thence through said sample while maintaining the temperature of the air and sample substantially constant, and measuring the electrical resistance of the sample.

16. An apparatus for testing the character factor of cotton comprising, in combination, a sample holder having a pair of spaced electrodes adapted to receive between them a sample of the cotton to be tested, means for maintaining the atmosphere permeating and surrounding the sample at a predetermined relative humidity, and means for measuring the alternating current resistance of the sample comprising a bridge connected with a source of alternating current at high frequency and adapted to be balanced, said electrodes being connected in shunt relation to one arm of said bridge.

17. In an apparatus for testing fibrous textile materials, the combination of a sample holder comprising a pair of spaced plates adapted to receive between them a sample of the material in the form of a thin disk, and means for directing conditioning air of predetermined relative humidity radially inward through said disk and thence outward from one side thereof.

18. In an apparatus for testing the character factor of unspun cotton, the combination of a test chamber having a pair of spaced plates adapted to receive between them a specimen of the cotton to be tested, in the form of a thin disk, means for conditioning the sample comprising a source of moist air, and means for directing the air radially inward of the sample.

19. In an apparatus for testing the character factor of textile fibrous materials of the nature of unspun cotton, the combination of a test chamber comprising a hollow base, a sample holder comprising a plate mounted in said base, a second plate mounted in spaced parallel relation to the first plate whereby said plates are adapted to receive between them a sample to be tested, and means effective to maintain the atmosphere within said chamber at a predetermined relative humidity.

20. In an apparatus for testing textile fibrous materials such as unspun cotton, the combination of a test chamber comprising a hollow base with an upright side wall, a sample holder comprising a plate mounted in said base with its edges spaced from said side wall and a second plate spaced from the first plate whereby said plates are adapted to receive between them a sample in the form of a disk, and means for supplying conditioned air to said chamber below the first plate, said second plate having an exhaust passage therein.

21. In an apparatus for testing textile fibrous materials, the combination of a test chamber comprising a hollow base, an electrode mounted in said base, a removable cover for the base providing a second electrode in spaced parallel relation to the first electrode to receive a cotton sample between them, means for supplying conditioned air to said chamber, and an electrical testing system including said electrodes.

22. An apparatus for testing textile fibrous materials such as cotton comprising, in combination, a sample holder having a pair of spaced electrodes adapted to receive between them a sample of the material to be tested, a test chamber enclosing the sample, means for supplying conditioning air to said chamber including a bubbling tower, an enclosing shell for said test chamber, a casing structure providing tank compartments for said tower and shell respectively, each of said compartments being adapted to contain a body of water, means for supplying or extracting heat from each of said compartments, means for controlling said heat supplying and extracting means to control the temperature of the water in each of said compartments, and an electrical system including said electrodes for measuring certain electrical characteristics of the sample.

PETER M. STRANG.
AUSTIN S. NORCROSS.